Jan. 17, 1939. K. H. QUASEBARTH 2,144,388
METHOD OF PRODUCING ARTICLES HAVING A VARIEGATED COMPOSITION
AND AN UNDULATED SURFACE AND THE PRODUCT THEREOF
Filed Aug. 24, 1935
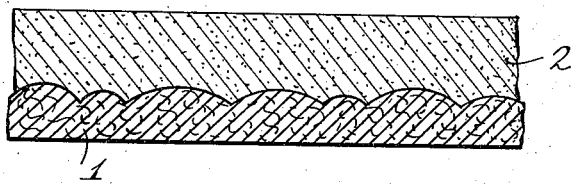
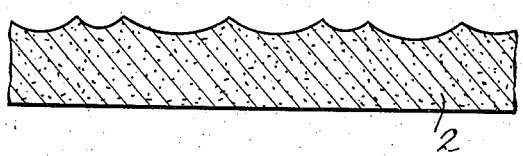
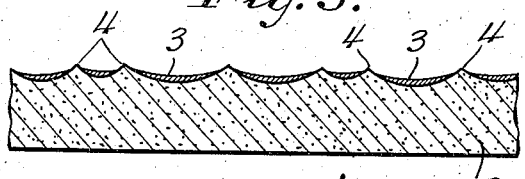
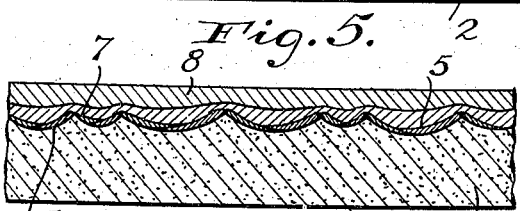
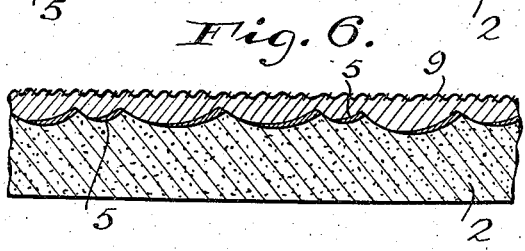
INVENTOR.
KURT H. QUASEBARTH
BY
ATTORNEY.

Patented Jan. 17, 1939

2,144,388

UNITED STATES PATENT OFFICE 2,144,388

METHOD OF PRODUCING ARTICLES HAVING A VARIEGATED COMPOSITION AND AN UNDULATED SURFACE AND THE PRODUCT THEREOF

Kurt H. Quasebarth, Hauppauge, N. Y.

Application August 24, 1935, Serial No. 37,652

7 Claims. (Cl. 18—61)

The present invention relates to a method of producing articles having a variegated composition and an undulated surface, and, more particularly, to a method of making a plastic article with an irregular surface having a multi-color effect.

Heretofore, in the manufacture of embossed rubber sheeting and products, the milled and compounded rubber was generally passed through a calendar provided with engraved rollers which imprint a corresponding pattern on the surface of a sheet. Various attempts have been made to simulate fabrics, natural skins, leaves, bark and other natural products and to obtain natural color effects especially in conjunction with an irregular surface structure. Many endeavors have been made to use latex. None of the proposals, as far as I am aware, have been successful in producing articles having the aforesaid characteristics in a wholly satisfactory, successful and practical manner.

I have discovered a method of making articles of the character described hereinbefore, especially plastic objects made of rubber and simulating natural skins and products having undulated surfaces and having multi-color effects.

It is an object of the invention to provide a method of producing articles having a variegated composition and an undulated surface on an industrial scale.

A further object of the invention is to provide a method of manufacturing plastic articles having irregular surfaces and having a multi-color effect which can be carried into practice in a simple and easy manner.

It is another object of the invention to provide a method of making imitations of natural skins and products which are practically identical therewith especially with respect to grain, color and the like.

It is also within the contemplation of the invention to provide a method of producing a composite rubber material especially suitable for the manufacture of articles such as rubber galoshes which is easier to handle when making galoshes on a last than the usual sheets of milled rubber compounds.

Other objects and advantages of the invention will become apparent from the following description taken in conjunction with the accompanying drawing, in which:—

Fig. 1 is a sectional view of a natural product to be simulated impressed in a mold of plastic material;

Fig. 2 shows a sectional view of a mold containing an impression of a natural product; and Figs. 3 to 6 depict sectional views of the mold shown in Fig. 2 in various stages in the making of composite plastic articles.

Broadly stated, the present invention comprises using a mould of a porous material, such as gypsum, clay or similar substances which contains the negative marking or impressions of the product to be simulated or imitated. The mould is prepared in the usual manner by pouring, for instance, plaster of Paris over a lizard skin which preferably is stretched on a plane surface and made water-repellent by treatment with a paraffin solution. Other materials beside skins with a rough or corrugated or undulated surface may be used for the same purpose, such as fabrics, wood, bark, etc. Plaster of Paris is allowed to set and is removed from the original skin which can immediately be used for the preparation of another mould. The mould is ready for use as soon as the majority of the water is evaporated. The preparation of the mould is shown in Fig. 1 in which the material to be imitated, such as a lizard skin, is designated by reference character 1. Over the surface of the lizard skin, a moulding material 2, such as a plaster of Paris, is poured. The completed plaster of Paris mould ready for use is illustrated in Fig. 2.

A proper latex mix is then applied to the surface of the prepared mould in a very thin layer either by pouring it or spraying it over the surface. The deposit of the latex mix (compounded rubber dispersion), herein termed the "compound" or the "rubber compound" will have a greater thickness in the indentations than on the top of the ridges. By adjusting the amount of the rubber compound and its concentration, it is very easy to have the first layer cover the indentations and render them opaque while leaving the ridges uncovered or barely covered. Thus, Fig. 3 illustrates the aforesaid effect which is obtained by pouring a thin rubber compound over the mould. A thick opaque portion 3 covers the indentations while the protruding ridge 4 is barely covered by the compound.

Fig. 4 shows the effect which can be obtained by spraying the same compound in a horizontal direction as shown by the arrow. In this case, the compound is mainly deposited on the sides 5 of the ridges exposed to the spray while the opposite sides 6 are practically free from a deposit. After the first layer is applied and sufficiently set not to mix with the following layer, another layer, preferably of a different color, is applied by any spreading or spraying method. As many colors may be used to give a multi-color effect it may either be built up to the thickness which is necessary for the article to be made or only just thick enough to cover the protruding parts of the mould in order to create the desired color effect. In the latter case, a third layer, preferably without pigments, will be applied to build up the necessary thickness of the sheet. Fig. 6 shows the completely built-up sheet with a second colored layer 7 and a third layer 8 to complete the thickness. To reenforce the sheet produced in the described manner, a fabric 9 may be cemented to the top of the sheet on the mould as shown in Fig. 6.

The composite material is dried at normal or slightly elevated temperature until the latex compound has a sufficient coherence to be pulled off without being torn. The moisture is then completely driven out by air drying. After drying, the sheet is ready to be used for building rubber galoshes on last in the usual way. It may, of course, be used for making other articles such as bags, belts, pouches, etc.

The following mixes have been successfully used in practical operation of the process:—

*Black Mix No. 1*

| Material | Parts by weight approximately |
| --- | --- |
| Concentrated latex with about 75% solids | 135 |
| Clay | 30 |
| Carbon black | 3 |
| Zinc oxide | 5 |
| Sulphur | 1 |
| Mercaptobenzothiazole (Captax) | 0.6 |
| Diphenylguanidine | 0.4 |
| Casein solution 10% | 3 |
| Water | 25 |

*White Mix No. 2*

| Material | Parts by weight approximately |
| --- | --- |
| Concentrated latex with about 75% solids | 135 |
| Clay | 30 |
| Zinc oxide | 5 |
| Titanium dioxide | 15 |
| Benzothiazyl disulphide (Altax) | 1 |
| Sulphur | 1 |
| Casein solution 10% | 3 |
| Water | 25 |

I claim:—

1. The method of producing integral rubber articles having undulated surfaces containing a plurality of colors which comprises providing a mold having an undulated surface of crests and hollows, spraying a fluid rubber compound containing one color on said surface to form a part of said article in an inverted position while controlling the angle of said spray to said undulated mold surface to fill one part of said hollows and to leave other parts of said surface uncoated, and successively spraying at different angles to said mold surface rubber compound containing at least one color different from said first color to coat uncovered portions of said hollows and to unite with sprayed rubber compound in said mold whereby an integral rubber article in an inverted position is formed having an undulated surface composed of exposed portions of underlying bodies producing a multi-color effect.

2. The method of producing integral rubber articles having undulated surfaces containing a plurality of colors which comprises providing a porous mold having an undulated surface, pouring a stream of a fluid rubber compound containing one color on an irreglar surface of said mold whilst controlling the positions of said stream and said mold with respect to each other to deposit a portion of said stream in one part of the hollows of said irregular surface and to leave uncovered parts of said hollows, and repeating said operations successively with other streams of fluid rubber compound containing different colors to fill other parts of said hollows and to complete the coating of said hollows and to unite with the rubber compound deposited from the previous stream of rubber compound whereby an integral rubber article in an inverted position is formed having an undulated surface composed of exposed portions of underlying bodies producing a multi-color effect in an inverted position.

3. An integral rubber article of manufacture having an undulated surface and multi-color effect and constituted of a plurality of colored segments united together, which comprises a set of separated bodies of rubber compound containing one color and forming a plurality of discontinuous exposed surfaces, and a second set of separated bodies of rubber compound containing another color and forming a plurality of discontinuous exposed surfaces, the bodies of the second set being interspersed between the bodies of the first set and uniting the entire group of bodies into an integral article and the exposed discontinuous surfaces of the first set of bodies being combined with adjacent exposed discontinuous surfaces of the second set of bodies to form a series of waves constituting the undulated surface of the article having a multi-color effect.

4. An integral rubber article of manufacture having an undulated surface and multi-color effect and constituted of a plurality of colored segments united together, which comprises a set of separated bodies of rubber compound containing one color and forming a plurality of discontinuous exposed surfaces, and at least one other set of separated bodies of rubber compound containing a different color and forming a plurality of discontinuous exposed surfaces, the bodies of the latter set being interspersed between the bodies of the first set and uniting the entire group of bodies into an integral article and the exposed discontinuous surfaces of the first set of bodies being combined with adjacent exposed discontinuous surfaces of the other set of bodies to form a series of waves constituting the undulated surface of the article in which said exposed surfaces of the first set of bodies extend from the beginning of waves to points intermediate the hollows of said waves and the exposed surfaces of the other set of bodies extend from said intermediate points to the hollows of said waves.

5. An integral rubber article of manufacture having an undulated surface and multi-color effect and constituted of a plurality of colored segments united together, which comprises a set of separated bodies of rubber compound containing one color and forming a plurality of discontinuous exposed surfaces, and other sets of separated bodies of rubber compound containing other colors interspersed between the bodies of the first set and uniting the entire group of bodies into an integral article and the individual exposed discontinuous surfaces of the first set of bodies being combined with individual exposed surfaces of the other sets of bodies to form a series of waves constituting the undulated surface of the article having a multi-color effect.

6. The method of producing integral rubber articles having undulated surfaces containing a plurality of colors which comprises directing a stream of a fluid rubber compound containing one color against an irregular surface of a mold whilst controlling the position of said stream with respect to said irregular surface to fill parts of hollows in said irregular surface with a fluid rubber compound containing one color and to leave unfilled parts of said hollows, and subsequently directing at least one other stream of fluid rubber compound containing at least one color different from said first color against said irregular surface to fill said unfilled parts of said hollows and to unite with rubber compound in the filled parts whereby an integral rubber article is formed in an inverted position having an undulated surface composed of exposed portions of underlying bodies producing a multi-color effect.

7. An integral rubber article of manufacture such as described in claim 5 wherein a layer of rubber is united to the separated bodies of rubber to form a base for said article.

KURT H. QUASEBARTH.